United States Patent

[11] 3,599,149

[72] Inventor Carroll T. Pardoe
Ellicott City, Md.
[21] Appl. No. 814,561
[22] Filed Apr. 9, 1969
[45] Patented Aug. 10, 1971
[73] Assignee The United States of America as represented by the Secretary of the Navy

[54] SEQUENCE RECOGNITION SYSTEM
13 Claims, 8 Drawing Figs.

[52] U.S. Cl. .......... 340/146.3 S
[51] Int. Cl. .......... G06k 9/00, G06k 11/02
[50] Field of Search .......... 340/146.3

[56] References Cited
UNITED STATES PATENTS

| | | | |
|---|---|---|---|
| 2,978,675 | 4/1961 | Highleyman | 340/146.3 |
| 3,045,911 | 7/1962 | Russell et al. | 340/146.3 |
| 3,196,399 | 7/1965 | Kamentsky et al. | 340/146.3 |
| 3,275,985 | 9/1966 | Dunn et al. | 340/146.3 |
| 3,484,746 | 12/1969 | Fralick et al. | 340/146.3 |

Primary Examiner—Thomas A. Robinson
Attorneys—R S Sciascia, J. A. Cooke and R J Erickson ABSTRACT: An incoming sequence of events is detected by the average excitability level of event recognizing circuit elements which are interconnected so as to form one closed loop for each sequence in the system repertoire. As each recognizer element in a particular loop is triggered by an incoming event, it increases or decreases the excitability of the other recognizer elements in the system depending upon whether or not the other recognizer elements may be triggered next for some particular sequence. A plurality of gathering circuit elements are provided and each is assigned to a different sequence in the system repertoire and each has inputs from the event recognizer elements corresponding to the events in the associated sequence. Each gathering element generates an analog output signal indicating whether or not all of its inputs have been excited during the preceding N command inputs and, if so, what was the average level of excitation. The output analog voltages from all of the gathering elements are then compared against one another to produce an output signal indicating which of the gathering elements has produced the largest magnitude analog output signal; i.e., which sequence in the system repertoire is nearest to the incoming sequence of events under investigation.

INVENTOR
CARROLL T. PARDOE

BY J. O. Tresansky
ATTORNEY

INVENTOR
CARROLL T. PARDOE

INVENTOR
CARROLL T. PARDOE

INVENTOR
CARROLL T. PARDOE

SEQUENCE RECOGNITION SYSTEM

BACKGROUND OF THE INVENTION

In many different types of investigatory and experimental work, it is desirable to be able to recognize or identify predetermined sequences of events. One well-known example is in the area of visual pattern or character recognition. Heretofore, however, attempts to accomplish event pattern or sequence recognition have met with only limited success, primarily because the prior systems have been quite complex, have a limited repertoire and do not allow for occasional errors in the input pattern or sequence.

SUMMARY OF THE INVENTION

Basically, a reoccurring sequence of events, representing an alphanumerical character or geometrical figure for example, is recognized or detected in accordance with the present invention by the average excitability level of a plurality of basic network element circuits which are interconnected so as to form one closed loop for each event sequence in the system repertoire. As each basic network element circuit in a particular loop is triggered by an incoming event, it increases or decreases the excitability of other elements, in the network depending on whether or not the other elements may be triggered next for some particular sequence in the system repertoire. More specifically, the basic network elements are interconnected with one another, as dictated by the event sequences to be detected, so as to either progressively excite one another or to inhibit one another in accordance with whether or not the associated events follow one another for a given sequence.

Each basic network element includes a voltage controlled oscillator which is controlled by excitatory and inhibitory input pulses from the interconnected basic network elements to generate a number of output pulses, for each excitatory or inhibitory pulse input, dependent upon the pulse width of each input. These generated pulses are subsequently applied to and registered on a reversible pulse counter. Whether a particular pulse input to a basic network element is excitatory inhibitory dictates whether the corresponding output pulses from the voltage controlled oscillator will be used to increase or decrease respectively the registered count on the reversible counter; i.e., registered count is indicative of the overall excitation level of the basic network element. This registered count is subsequently converted to an analog voltage which is used to control a voltage controlled monostable multivibrator in such a manner that the multivibrator produces an output pulse whose width varies in proportion to the registered count. This variable width output pulse is subsequently applied, as either the excitatory or inhibitory input pulse, to the interconnected basic network elements.

A so-called gathering element is provided for each of the different sequences in the system repertoire. Each gathering element is connected to receive the variable width output pulse from each of the associated basic network elements and includes a counter which is controlled by the input pulses from the associated basic network elements to register a total or cumulative count corresponding to the width of all input pulses received from the connected basic network elements during the occurrence of the number of events contained in the associated sequence. This count is subsequently converted to a proportionate output analog voltage.

The output analog voltages from all of the gathering elements; i.e., one analog output voltage for each sequence in the system repertoire, are then applied to a comparison circuit comprising a multiple input differential amplifier which is biased such that the most positive input analog signal will be detected to thus indicate which sequence is most likely being inputted to the recognizer of the present invention. Moreover, in the comparison circuitry, a variable reference voltage is employed and essentially establishes what may be thought of as a confidence level for the output indication. More specifically, if this reference voltage is set to a relatively low value, the input sequence may differ considerably from the preset or programmed sequence and still give an output indication that that sequence in the repertoire is occurring; whereas, if the reference voltage level is set at a high value, the input sequence must be precisely correct to provide an output indication. In other words, when the voltage reference has a low value, numerous input errors can occur without changing the output whereas if the reference voltage is at a high value, no errors or very infrequent errors can occur without changing the output indication.

In view of the foregoing, one object of the present invention is to provide a system capable of recognizing reoccurring sequences of temporal events.

A further object of the present invention is to provide a sequence recognition system which produces an output based on the probability that a particular sequence of events has, or has not, occurred.

Another object of the present invention is to provide a sequence recognition system utilizing individual event detecting circuits which are interconnected in closed loops corresponding to each of the sequences in the system repertoire and which event recognizing circuits are connected progressively in an excitatory manner as stated by a desired sequence and are connected in an inhibitory fashion for mutually exclusive events.

Another object of the present invention is to employ, in closed loop connection, a plurality of event recognizing circuits each capable of recognizing an assigned event and circuitry for each repertoire sequence so as to produce, on a single line, indication of whether or not a particular sequence of events has occurred.

A further object of the present invention is to employ comparison circuitry responsive to a signal proportional to the probability that each system sequence has occurred for comparing these proportionate signals so as to cause the largest of these signals to produce an output indication; i.e., the sequence of events which most likely has occurred produces the output indication.

A still further object of the present invention is to employ means for establishing a variable confidence level in the sequence recognition system.

Other objects, purposes and characteristic features of the present invention will in part be pointed out as the description of the invention progresses and in part be obvious from the accompanying drawings, wherein:

FIG. 1 illustrates, in block diagram form, one embodiment of the sequence recognition system of the present invention wherein a plurality of basic network elements are interconnected in closed loops so as to perform recognition of associated sequences of input temporal events and wherein a separate gathering element is connected to the outputs of the basic network elements associated with each sequence in the system repertoire;

Figure 1:
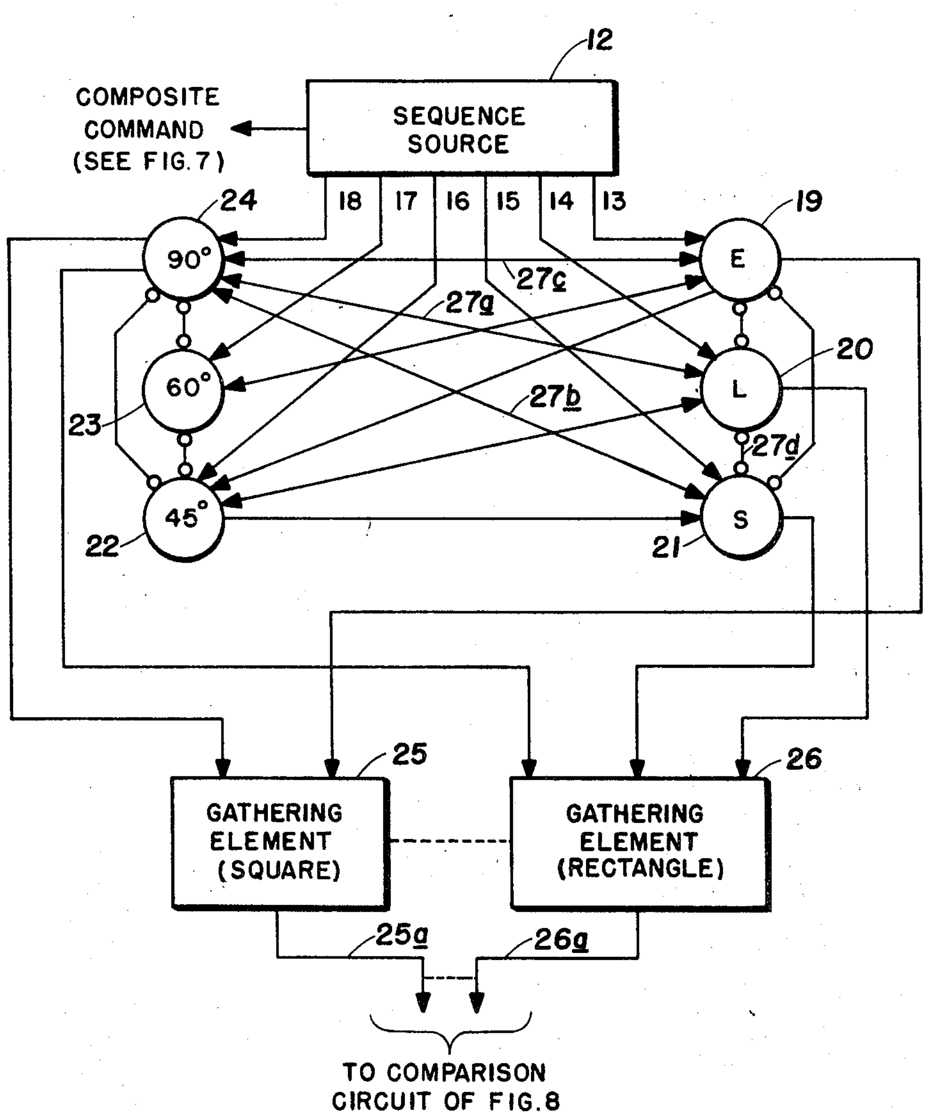
Figure 8:
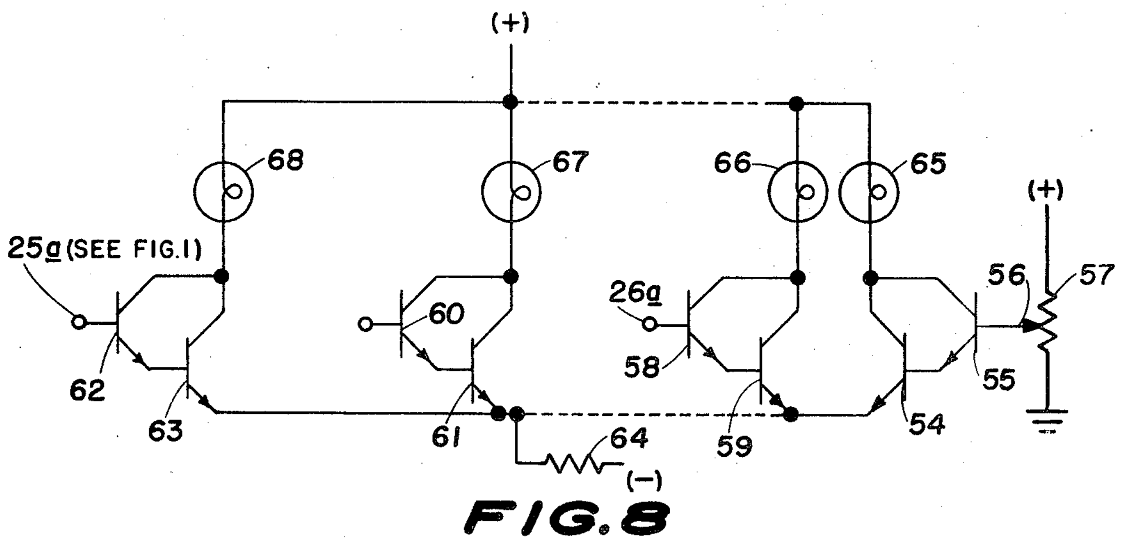
Figure 6:
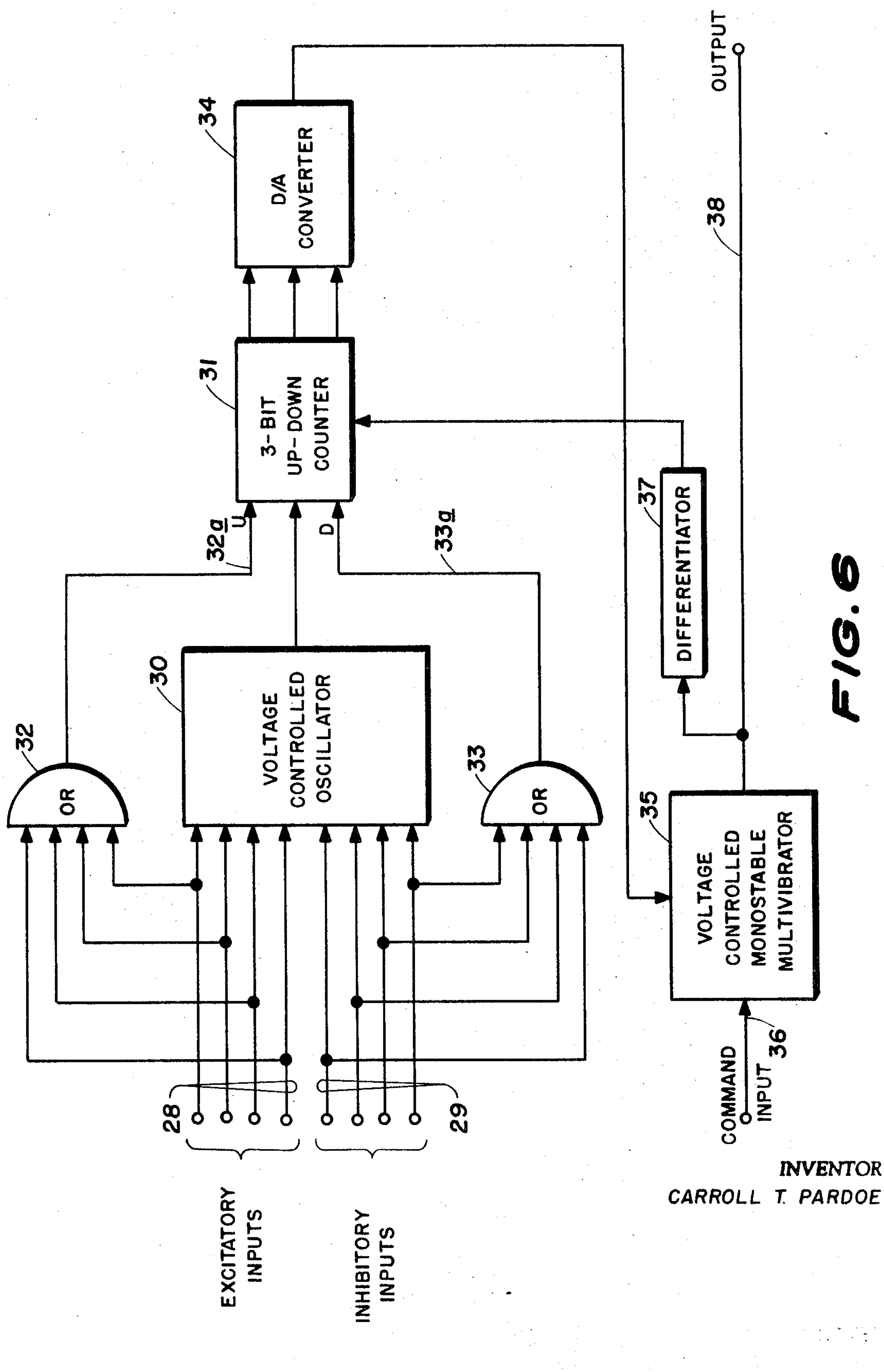
FIG. 6 is a block diagram of one embodiment of a typical basic network element circuit employed in the sequence recognition system of FIG. 1 for detecting or recognizing the occurrence of an assigned event.
Figure 7:
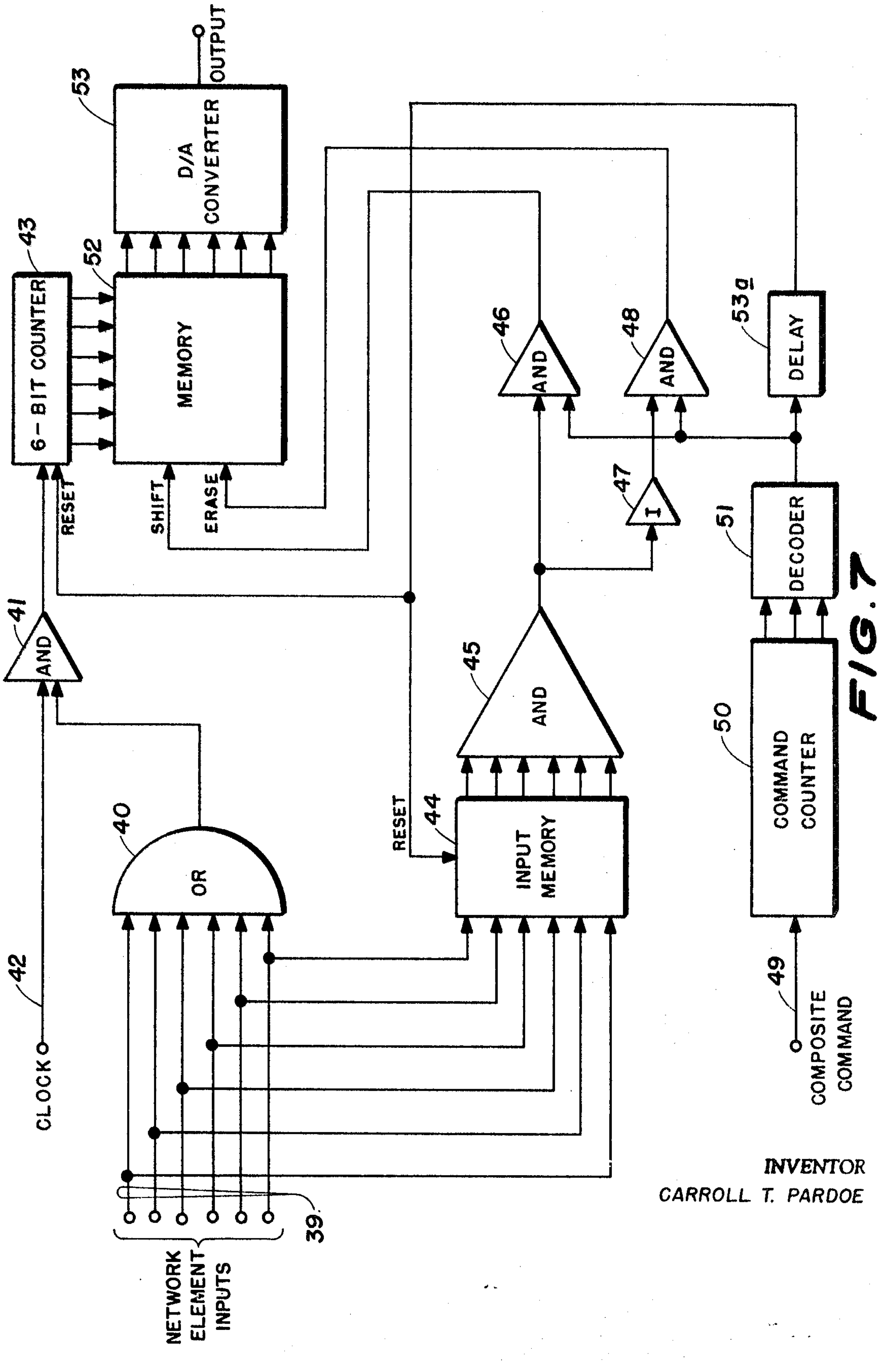

FIG. 7 is a block diagram of a typical gathering element circuit employed in the sequence recognition system of FIG. 1 for the purpose of gathering the output signals from the basic network elements of FIG. 6 and producing an output representing the probability that an assigned sequence has occurred; and FIG. 8 is a circuit diagram of one embodiment of comparison circuitry employed in the sequence recognition system of the present invention for the purpose of comparing the outputs from the various gathering elements typically shown in FIG. 7.

As mentioned previously, the sequence recognition system of the present invention utilizes a plurality of so-called basic network elements to detect the occurrence of the various temporal events of interest. These basic network elements, in order to perform the sequence recognition function, are then interconnected to form a closed loop for each sequence in the system repertoire and progressively excite or inhibit one another depending upon whether or not they are associated with successive events in a given sequence.

Figure 2:
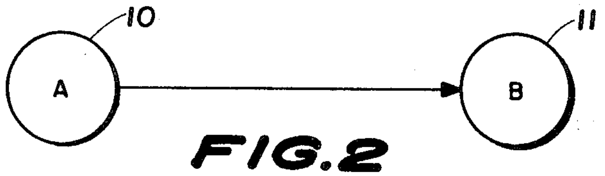
FIGS. 2, 3, 4 and 5 illustrate diagrammatically various ways of interconnecting the basic network elements of FIG. 1.
Figure 3:
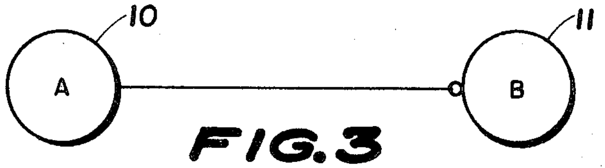
Figure 4:
Figure 5:
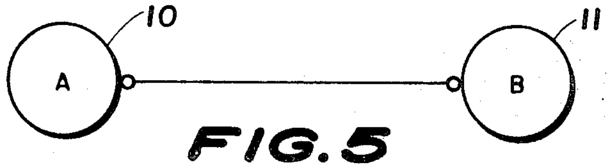

Referring now to the drawings, FIGS. 2 through 5 diagrammatically illustrate the various manners of interconnecting two basic network elements designated at 10 and 11 and utilized for detecting or recognizing events A and B respectively. More specifically, FIG. 2 illustrates basic network element 10 exciting element 11; FIG. 3 illustrates element 10 inhibiting element 11; FIG. 4 illustrates mutual excitation between elements 10 and 11; and, FIG. 5 illustrates mutual inhibition between elements 10 and 11. By selectively employing the various interconnections illustrated in FIGS. 2 through 5, a minimum number of basic network elements may be connected together in a plurality of closed loop configurations corresponding to the number of different sequences to be detected or recognized, with a given basic network element included in more than one of the closed loops.

The manner of interconnecting six of these basic network elements so as to recognize four different geometrical figures for example, is illustrated in FIG. 1 of the accompanying drawings. More specifically, the illustrated embodiment of FIG. 1 is capable of recognizing a square, a rectangle, an equilateral triangle and a 45°–45° right triangle.

A source of input sequence event pulses is designated, in FIG. 1, at 12 and may comprise any well-known apparatus capable of selectively producing output pulses on the output lines 13, 14, 15, 16, 17 and 18 demarcating the occurrence of predetermined temporal events. For example, the sequence source 12 might represent apparatus capable of reading a geometrical figure and selectively producing: an output pulse on line 13 when the reader senses the occurrence of an equal side length in the geometrical figure under investigation; a pulse on line 14 when a relatively long line length is sensed; an output pulse on line 15 when a relatively short line occurs; an output pulse on line 16 when a 45° angle is detected; an output pulse on line 17 when a 60° angle is detected; and, an output pulse on line 18 when a 90° angle is detected. These output pulses from the sequence source 12 are respectively applied to and trigger the basic network elements 19, 20, 21, 22, 23 and 24 which bear the corresponding event designation in the middle of the circle representing each of the basic network elements 19 through 24 in FIG. 2. The sequence source 12 also generates a COMPOSITE COMMAND signal to be described later in conjunction with FIG. 7.

As will be described in detail hereinafter, each of the basic network elements 19 through 24 responds to the control pulse from the sequence source 12, as well as the output pulses (either excitatory or inhibitory) from the interconnected basic network elements, and generates an output pulse whose width is an indication of the probability that the assigned event has occurred in its correct sequential position. These variable width output pulses from the basic network elements associated with a particular sequence (or geometrical figure in the illustrated embodiment) are then applied to a so-called gathering element which produces an output level whose magnitude is proportional to the probability that such and such a sequence has occurred. For example, in FIG. 1, the output pulses of the basic network elements 24 and 19, corresponding to 90° and equal line length events respectively, are applied to gathering element 25 inasmuch as these are the only two events which occur in a sequence corresponding to the recognition of a square figure; whereas, the outputs from the basic network elements 20, 21 and 24 are connected to the gathering element 26 corresponding to the events which occur during the recognition of a rectangle. The gathering elements (not shown) for the two additional figures (equilateral land 45°–45° right triangles) in the repertoire of the network of FIG. 1 are represented by the dotted line extending between gathering elements 25 and 26.

In traversing the outline of a rectangle, a relatively long length line or side (detected by element 20) is followed in succession, by a 90° angle (detected by element 24), a relatively short line or side length (detected by element 21) and another 90° angle. Consequently, in order to accurately recognize this sequence of events associated with the rectangle, the 90° basic network element 24 is interconnected, in a closed loop manner to be described later, such that it both supplies and receives excitation from both of the basic network elements 20 and 21. This mutual excitation is represented by lines **27*a* and 27*b* in FIG. 1. Similarly, in order to recognize a square, the 90° basic network element 24 is mutually excitatory (line 27*c*) with the basic network element 19 associated with the equal side or line length. In FIG. 1 it should also be noted that whenever two events cannot occur in sequence for any of the sequences in the system repertoire, the corresponding basic network elements are mutually inhibiting. For example, none of the sequences recognizable by the system embodiment shown in FIG. 1 involve the occurrence of a long line length immediately followed by a short line length or vice versa and therefore the basic network elements 20 and 21 are mutually inhibiting, as represented by line 27*d* in FIG. 1. It should also be noted that in FIG. 1 no redundant basic network elements are required; e.g., the same element 24** can be used in recognizing both the square and the rectangle.

The outputs **25*a* and 26*a* of the gathering elements 25 and 26 respectively, as well as from the other two gathering elements (not shown) for the equilateral triangle and the 45°, 45° right triangle, are applied to the comparison circuitry of FIG. 8 which will be described in detail hereinafter. At the comparison circuitry, the output signals from the gathering elements are compared against one another and the one with the greatest magnitude is selected as most closely identifying the particular event sequence being received from the sequence source 12 of FIG. 1**.

Referring now to FIG. 6 of the accompanying drawings and the block diagram of a typical basic network element, each basic network element is provided with a plurality of excitatory input lines 28 and inhibitory input lines 29 in accordance with the particular manner in which that basic network element is interconnected to the other basic network elements in the system. In the embodiment shown in FIG. 6, for example, the illustrated basic network element is adapted to receive four excitatory inputs and four inhibitory inputs. As mentioned previously, these excitatory and inhibitory inputs come from the outputs of the interconnected basic network elements, and whether or not a particular basic network element receives an excitatory or inhibitory input from another basic network element depends upon whether the associated events occur in succession for any sequence in the system's repertoire.

A voltage controlled oscillator 30 is included in the typical basic network element of FIG. 6 and receives, one at a time, the excitatory and inhibitory inputs 28 and 29 from the other basic network elements in the system. The oscillator unit 30 may be of any number of conventional designs adapted to produce no output when no input pulse is applied, but capable of generating, for each input pulse, a number of output pulses in proportion to the width of that input pulse. The output pulses from the oscillator unit 30 are applied to a reversible counter 31.

Each of the input excitatory lines 28 is also connected to an OR gate 32 which produces an output, on line **32*a* to the reversible counter 31, any time there is an excitatory input pulse being received by the basic network element. This output from the OR gate 32 controls the counter 31 to its upcount condition and thus causes the pulse output from the oscillator 30 to increase the count of the reversible counter 31 in accordance with the number of pulses generated by the oscillator 30 for each excitatory input pulse. Conversely, any time that an inhibitory input pulse is received on one of the input lines 29, the OR gate 33 pulses line 33*a* and thus causes the pulse output from the oscillator 30 to down-count the counter 31** in accordance with the number of pulses produced by the oscillator 30 for each inhibitory input pulse. In this manner, the reversible counter 31 is controlled to register a pulse count which depends both upon whether the input pulses received by the basic network element are excitatory or inhibitory in nature and upon the width of the input excitatory and/or inhibitory pulses. In other words, the counter 31 registers a count which is indicative of whether or not the associated event has occurred.

The count registered by the reversible counter 31 is subsequently applied to a digital to analog converter 34 which converts this pulse count into a proportionate analog voltage. This analog voltage is then applied to and controls the time constant within a voltage controlled monostable multivibrator 35 of any well-known construction. The monostable multivibrator 35 also receives a COMMAND INPUT signal on line 36 in the form of a pulse demarcating the actual occurrence of the event associated with or to be detected by the basic network element circuitry of FIG. 6. In other words, the pulse on line 36 would be one of the pulses developed selectively on the lines 13 through 18 in FIG. 1 by the sequence source 12.

When the monostable multivibrator 35 receives the input command pulse on line 36, it generates an output pulse whose width is proportional to the count registered at reversible counter 31, inasmuch as the time constant for the multivibrator 35 has been preset in accordance with this pulse count by the analog voltage output from D/A converter 34. A differentiator circuit 37 is connected to the output of the monostable multivibrator 35 and is effective to generate a reset pulse for the counter 31, on the trailing edge of the output pulse produced by the monostable multivibrator 35. This reset pulse places the reversible counter in its center or midcount position. The controlled width output pulse from the monostable multivibrator 35, appearing on line 38, is then connected as either an inhibitory or excitatory input to the other basic network elements of the system, as previously discussed.

Referring now to FIG. 7 of the drawings which illustrates a typical gathering element, the output pulse of each basic network element associated with one of the events in a given sequence in the system repertoire is also applied, at one of the input lines 39, to the gathering element associated with that particular sequence; i.e., there is one gathering element such as that typically shown in FIG. 7 for each system sequence. In FIG. 7, the illustrated gathering network is shown as being associated with a sequence comprising six distinct temporal events and therefore is provided with six input lines 39 connected to the output of six different basic network elements. More specifically, the input lines 39 in FIG. 7 are each connected to the output of one of the basic network elements for the associated sequence and apply the respective outputs from these basic network elements as inputs to an OR gate 40. Consequently, the AND gate 41 is rendered effective to pass CLOCK pulses received on input line 42 from a suitable clock source (not shown) to a 6 bit counter 43 whenever any of the associated basic network elements are producing an output pulse. The counter 43 registers a cumulative count of the total number of CLOCK pulses passed by the AND gate 41 and thereby indicates the total width of all input pulses received from the basic network elements connected to input lines 39.

The input pulses received from the basic network elements on lines 39 are also applied to an input memory unit 44 which keeps track of the occurrence of each of the input pulses. An AND gate 45 monitors the state of the input memory unit 44 and produces an output pulse only after all events in the particular sequence assigned to the illustrated gathering network have occurred. The output pulse from the AND gate 45 is applied as one input to AND gate 46 and simultaneously, through an inverter 47, to one input of AND gate 48.

Each time the sequence source 12 in FIG. 1 produces a command output pulse to one of the lines 13 through 18 in FIG. 1, it also generates a COMPOSITE COMMAND pulse signal which is applied to the input line 49 in FIG. 7. These COMPOSITE COMMAND pulses appearing on input line 49 are counted at command counter 50. Decoder unit 51 monitors the state of the command counter 50 and produces an output pulse after the sequence source 12 of FIG. 1 has generated sufficient output pulses (on lines 13 through 18) to encompass the assigned sequence. For the illustrated gathering element of FIG. 7, the decoder 51 would thus produce an output pulse after six COMPOSITE COMMAND pulses had been received on input line 49.

The output of the decoder unit 51 is applied as the second input to each of the AND gates 46 and 48. Consequently, when the decoder 51 is producing an output to indicate that the proper number of pulses have been produced by the sequence source 12 to identify the particular sequence to which the apparatus of FIG. 7 is assigned and the AND gate 45 has produced an output to indicate that all events in the assigned sequence have occurred, the AND gate 46 is operated to shift the contents of the 6-bit counter 43 into the main memory unit 52. Thereupon, the digital to analog converter 53 produces an analog signal having an amplitude proportional to the total or cumulative pulse count registered by counter 43 and also proportional, therefore, to the total pulse width received on the input lines 39 and the excitation level of the associated basic network elements.

As mentioned previously, the output of the decoder unit 51 is also applied to the AND gate 48, along with the inverted output of AND gate 45 which indicates that not all of the input pulses for the assigned sequence have occurred. As a result, the AND gate 48 produces an output if, after the sequence source 12 in FIG. 1 has produced the proper number of output pulses in the assigned sequence, all of the associated basic network elements connected to the input lines 39 have not supplied their respective output pulses to the gathering element. This output from the AND gate 48 is employed to erase the memory 52 so that if the memory 52 is in a high state because of a prior sequence, it will not remain in that state during a different sequence. The output signal of the decoder 51 is also delayed, at delay network 53*a* and then utilized to reset both the input memory 44 and the main memory 52.

Referring again to FIG. 1 of the drawings, it will be recalled that each of the gathering elements 25, 26 etc. supplies its respective analog output signal to the comparison circuitry of FIG. 8 which detects which of the analog outputs is largest in amplitude, so as to indicate which sequence has most likely occurred. More specifically, the comparison circuitry of FIG. 8 comprises a multiple input differential amplifier arrangement wherein one-half of the differential amplifier is composed of transistor pair 54—55 connected to a variable reference voltage generated at the movable arm 56 of potentiometer 57. The other half of the differential amplifier circuitry comprises a plurality of transistor pairs, such as transistor pair 58—59, transistor pair 60—61 and transistor pair 62—63, each of which is connected to receive the analog output signal from a different one of the gathering elements shown typically in FIG. 7. By way of example, the transistor pair 62—63 is shown as being connected to output 25*a* of gathering element 25 in FIG. 1 and transistor pair 58—59 is shown as being connected to output 26*a* of gathering element 26 in FIG. 1.

More specifically, the analog output signals from each of the gathering networks are applied to the bases of the transistors 58, 60 or 62. The emitters of the NPN transistors 54, 59, 61 and 63 are connected, through a common biasing resistor 64, to a source of negative (−) potential; whereas, the collectors of each of the transistors 54 through 63 are connected serially, through indicator lamps 65, 66, 67 and 68, to a positive (+) supply voltage. This multiple input differential amplifier circuitry shown in FIG. 3 operates in a conventional manner such that only the amplifier stage which receives the largest magnitude output analog signal from a gathering network (see FIG. 7) is effective to conduct and cause the associated indicator lamp 66 through 68 to light, thus providing a visual indication of which sequence most likely has just occurred. This is assuming, of course, that one of the gathering elements has produced an analog voltage whose magnitude is greater than the variable reference voltage which is applied to transistor pair 54—55 controlling lamp 65.

As mentioned previously, the inclusion of this variable reference voltage picked-off at the potentiometer arm 56 enables the operator to select what may be thought of as a confidence level for the sequence recognition system of the present invention. More specifically, if the potentiometer arm 56 is set to select a relatively low reference voltage, the input sequence may vary considerably from the desired sequence and still give an indication, on one of the indicator lamps 66 through 68, for the figure in the system repertoire which this sequence most nearly represents. On the other hand, if the arm 56 is adjusted to pickoff a relatively high value reference voltage, the transistor pair 54—55 will conduct more and increase the voltage drop at biasing resistor 64. As a result, the input sequence must be more precisely correct in order for the appropriate output indicator lamp 66 through 68 to become illuminated.

From the foregoing discussion, it should be obvious that the condition of the plurality of basic network elements 19 through 24 contained in the system of FIG. 1 is sufficient, without more, to determine which, if any, characteristic temporal sequence has been occurring. However, in order to make the translation of the element network state to humanly useable signals, or to other machine applications, more tractable, the gathering elements 25, 26 etc. operate, as described above in connection with FIG. 7, to transform the state of the basic network elements into a single signal, on a single line such as **25*a* and 26*a***, for each of the sequences (e.g., figures) in the system repertoire.

Obviously, many modifications, adaptations and alterations are possible in the light of the above teachings. It is therefore to be understood at this time that within the scope of the appended claims, the invention may be practiced otherwise than as specifically described.

I claim:

1. A system for recognizing a preselected repertoire of temporal event sequences comprising, a plurality of interconnected event recognizer means each adapted to receive an input signal demarcating the occurrence of an assigned temporal event and each being capable of producing an output signal which is variable in accordance with levels of excitation and inhibition of said event recognizer means to indicate the occurrence of said assigned event, the output signal from each of said event recognizer means being a variable area output signal pulse and each of said event recognizer means comprising, pulse generating means, means receptive to the variable area output signal pulse produced by other interconnected ones of said event recognizer means in said plurality of event recognizer means for controlling said pulse generating means to generate a number of output pulses for each output signal pulse produced by said other event recognizer means in proportion to the area of said output signal pulse, reversible counter means operably connected to register a count of the output pulses generated by said pulse generating means for each output signal pulse received by said receptive means, means responsive to said received output signal pulses for selectively controlling said reversible counter means to either increase or decrease its registered count for each output signal pulse depending respectively upon whether that output signal pulse is inhibitory or excitatory, and means responsive to the input signal demarcating the occurrence of the assigned temporal event and to the count registered by said reversible counter means for producing an output signal pulse whose pulse area is proportional to the count registered by said counter means, and means responsive to the output signal pulse produced by one of said event recognizer means for selectively varying the respective excitation and inhibition levels of other interconnected ones of said event recognizer means in accordance with whether or not the assigned events for said other event recognizer means occurs subsequently to the assigned event for said one event recognizer means in any of the sequence contained in the system repertoire.

2. The sequence recognition system specified in claim 1 and further including, a plurality of gathering means each operably connected to receive the output signal pulses from a preselected group of said event recognizer means corresponding to an assigned sequence and capable of producing an output signal which varies in proportion to the occurrence probability of said assigned sequence.

3. The sequence recognition system specified in claim 2 and further including, means operably connected to receive the output signals from each of said gathering means for detecting which of said gathering means has produced an output signal indicative of the greatest occurrence probability.

4. The sequence recognition system specified in claim 1 wherein said means for selectively varying the excitation and inhibition levels for said interconnected event recognizer means includes, means interconnecting different groups of said plurality of event recognizer means in closed loops corresponding to the different event sequence in the system repertoire, the variable area output signal pulses produced by the event recognizer means in each closed loop being effective to provide excitation progressively about said closed loop.

5. The sequence recognition system specified in claim 1, wherein said variable area output signal pulse producing means comprises, a voltage controlled multivibrator rendered effective by said input signal demarcating the occurrence of the assigned temporal event to generate an output pulse whose width varies in proportion to an applied analog signal, and converter means connected to said reversible counter means for converting the count registered by said counter means into an analog control voltage for application to said voltage controlled multivibrator.

6. The sequence recognition system specified in claim 2 wherein each of said gathering means comprises, a plurality of input lines each connected to receive the variable area output signal pulse from a different event recognizer means assigned to a different temporal event contained within a predetermined assigned event sequence, and means operably connected to said plurality of input lines and responsive to said variable area output signal pulses from said connected event recognizer means for producing an output analog signal whose magnitude is indicative of the probability that said assigned sequence has occurred.

7. The sequence recognition system specified in claim 6 wherein the output signal pulse from each of said connected event recognizer means is a variable width pulse and said output analog signal producing means for said gathering means comprises, an OR gate connected to said plurality of input lines for detecting when any one of said input lines is receiving an output signal pulse from one of said connected event recognizer means, a source of clock pulses, an AND gate connected to said clock pulse source and said OR gate for passing said clock pulses only during the width of each received output signal pulse from one of said connected event recognizer means, a cumulative counter connected to said AND gate for registering a count of the total number of clock pulses passed by said AND gate during the occurrence of said assigned sequence of events, and means operably connected to said cumulative counter for converting said registered total count into a proportionate magnitude analog output signal.

8. The system specified in claim 7 and further including, a first memory means connected to said plurality of input lines for storing the variable width output signal pulses received from said connected event recognizer means, a second AND gate operably connected to monitor the state of said first memory means for producing an output pulse only after each of said input lines has received an output signal pulse from the connected event recognizer means, means for detecting the occurrence of the number of events contained within the assigned sequence for said gathering means, and a third AND gate operably connected to said second AND gate and said detecting means for enabling said converting means to convert said registering total count into a proportionate magnitude analog output signal.

9. The system specified in claim 8 and further including, a second memory means operably connected to store the total count registered by said cumulative counter, said converter means being connected to monitor the count stored by said second memory means and convert it into said proportionate magnitude analog output signal, and said third AND gate being effective to control the time at which said total count is shifted from said cumulative counter into said second memory means.

10. The sequence recognition system specified in claim 3 wherein each of said gathering means produces an output analog signal whose magnitude is proportional to the occurrence probability for the assigned event sequence and wherein said detecting means comprises, comparison circuit means connected to said plurality of gathering means for detecting which of said gathering means is producing the largest magnitude output analog signal, and means responsive to the condition of said comparison circuit means for providing an indication of which of said gathering means is producing the largest magnitude output analog signal.

11. The sequence recognition system specified in claim 10 wherein said comparison circuit means comprises a multiple input differential amplifier circuit having one input connected to each of said gathering elements.

12. The sequence recognition system specified in claim 10 and further including a source of variable reference signal operably connected to said comparison circuit means for establishing a confidence level for the indication provided by said indicating means.

13. The sequence recognition system specified in claim 4 wherein at least one of said event recognizer means is interconnected in a plurality of said closed loops.